(No Model.)
D. G. FITZ-GERALD.
MANUFACTURE OF PLATES OR ELEMENTS FOR VOLTAIC BATTERIES.
No. 358,111. Patented Feb. 22, 1887.
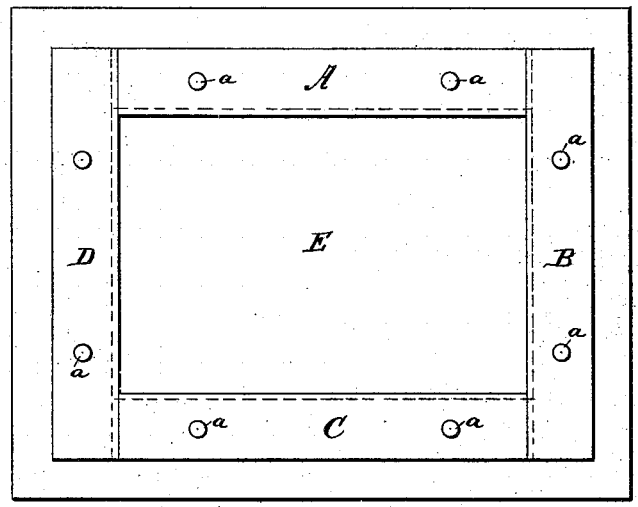
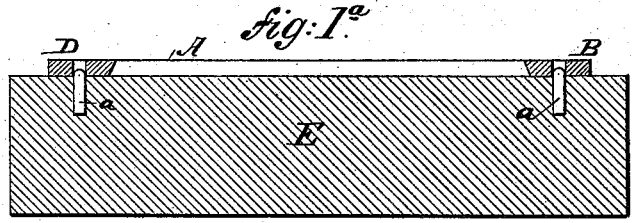
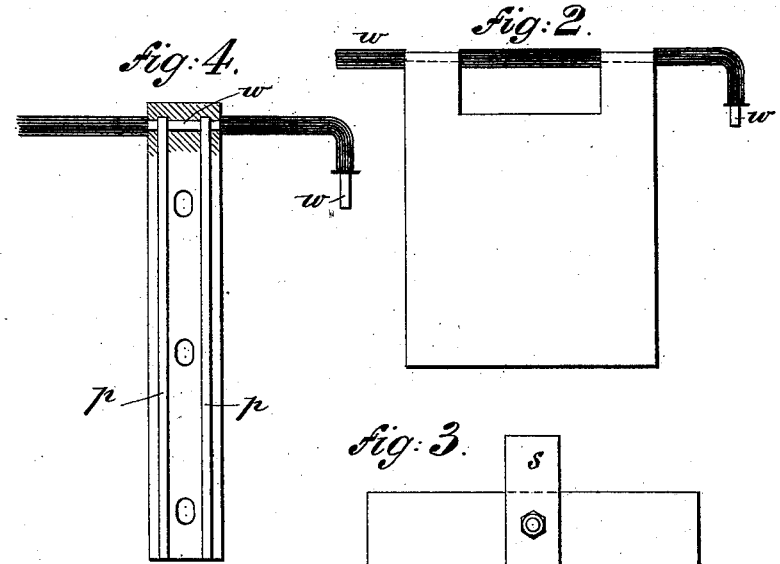
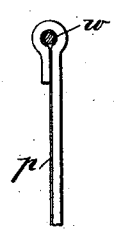
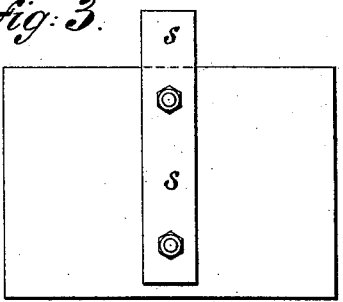
WITNESSES:
Gustav Schneppé
John M. Speer
INVENTOR
Desmond G. Fitz-Gerald
BY Briesen & Steele
ATTORNEYS.
N. PETERS, Photo-Lithographer, Washington, D. C.

UNITED STATES PATENT OFFICE.

DESMOND GERALD FITZ-GERALD, OF BRIXTON, COUNTY OF SURREY, ASSIGNOR TO THE PRIMARY BATTERY COMPANY, (LIMITED,) OF HANOVER SQUARE, COUNTY OF MIDDLESEX, ENGLAND.

MANUFACTURE OF PLATES OR ELEMENTS FOR VOLTAIC BATTERIES.

SPECIFICATION forming part of Letters Patent No. 358,111, dated February 22, 1887.

Application filed April 16, 1886. Serial No. 199,046. (No model.)

*To all whom it may concern:*

Be it known that I, DESMOND GERALD FITZ-GERALD, of 6 Akerman Road, Brixton, in the county of Surrey, England, electrician, have invented or discovered new and useful Improvements in the Manufacture of Plates or Elements for Voltaic Batteries; and I, the said DESMOND GERALD FITZ-GERALD, do hereby declare the nature of the said invention and in what manner the same is to be performed to be particularly described and ascertained in and by the following statement thereof—that is to say:

Figure 1 is a top view of the frame used in my new manufacture of plates or elements. Fig. 1ª is a vertical section of same. Fig. 2 is a face view of the positive element. Fig. 3 is a face view of a plate intended for conversion into a negative element. Figs. 4 and 5 show modifications of same.

My invention consists in improvements in the manufacture of plates or elements to be used in voltaic batteries, and more especially in secondary batteries.

It has for its object, in the first place, the production of plates, layers, or masses, mainly composed of oxide of lead in a dense and coherent form, such plates, layers, or masses being subsequently either reduced to the condition of porous metallic lead or converted into a highly conductive form of peroxide of lead, (which, from its hardness and the fact of its being produced at the positive pole in electrolysis, I term "lithanode,") with a view to their constituting the positive and negative elements of a secondary (or primary) voltaic battery.

In carrying out this part of my invention I take an oxide of lead other than the peroxide (preferably the monoxide in the form of litharge) and I bring it into admixture with a solution which (after the plastic mass thus produced has been molded into the required form, or has been applied as a layer upon any given surface) will effect a partial and more or less gradual chemical change in the oxide, and so cause it to "set" and to assume a dense and coherent condition, permitting of the substance being handled and being immersed in a fluid without falling to pieces. The solution I prefer to use for this purpose is that of a salt constituted by ammonia as a base in combination with an acid which (when set free by decomposition of the ammonia salt) will combine with the oxide of lead and form an insoluble or nearly insoluble compound of lead. Such salts are the sulphate, phosphate, chromate, tartrate, oxalate, borate, and sesquicarbonate of ammonia and the chloride of ammonium; but any salt (such as hydropotassic or hydrosodic sulphate, potassic or sodic sulphate, chloride, or chromate) which becomes wholly or partly decomposed by oxide of lead, producing an insoluble or nearly insoluble compound of this metal, will more or less perfectly answer the purpose in view—viz., the production of a coherent plate or mass mainly composed of oxide of lead. The use of a chloride and also the treatment of the molded plates with chlorine, hereinafter referred to, are sometimes to be avoided (in view of the possibility of evolving chlorine in the operation of "charging" the element as anode) unless the chloride of lead which is formed be removed by washing the plate in hot water. By using salts the plates obtained are harder and better than where free acid is used, as the decomposition of the salt and the union of its acid radical with the lead take place slowly, and the necessary time is gained for the rearrangement of the molecules which produce the setting.

I will now proceed to give examples of the modes in which I carry out this portion of my invention.

Commencing with the manufacture of rectangular plates—say four by seven inches and from .13 to about .2 inch in thickness—to be made the anodes in the electrolytic process of charging or otherwise converted into negative elements, I employ a frame or mold of dimensions corresponding to those above given, such as that represented in Figs. 1 and 1ª, where A, B, C, and D are separate strips, which, when fixed by dowel-pins *a a* on a base-block, E, make up a frame or mold for the production of the plates. Such frame is slightly undercut or beveled on the inner edge, in order to facilitate the subsequent removal of the frame from the plastic mass. The base-block is first covered with a piece of moistened cotton cloth having holes corresponding to the pins $a$ $a$, and the sides of the frame are then placed in position. The mold being thus in readiness, I take from ten to seventeen ounces of litharge, according to the required thickness of the plate, which is determined by that of the frame-pieces, and as rapidly as possible mix it with a half-saturated solution of sulphate of ammonia sufficient in quantity to convert the litharge into a pasty mass. This mass, by means of a spatula or small trowel, is spread evenly within the frame. It is then covered with a piece of moistened fabric, on which is placed a piece of felt, and upon this another block of wood extending at least as far as the outside of the frame, and the whole then subjected to pressure in a hydraulic or ordinary screw-press.

With a view to increase the porosity of the elements, I may incorporate with the plastic mass a quantity of fibrous asbestus, slag-wool, roughly-powdered earthenware or pumice, or other substances adapted for the purpose in view and possessing a sufficient degree of chemical inalterability. Such substances, however, if they be employed, should be used sparingly, as they diminish the conductivity, and consequently the efficiency, of the elements, and those portions of the elements at which contact is made to effect the charge or discharge of the element should in all cases be freed from the inert and badly-conducting substances in question.

After the compression of the plastic mass, the top block, the felt, the fabric, and the pieces A, B, C, and D are removed, and the molded plate is then covered with a piece of dry fabric, upon which I place a slab, preferably of porous and perforated earthenware, and then invert the whole. The base-block and the piece of fabric which was laid on it in the first instance may then be successively removed from the plate. I then place another slab of porous earthenware directly upon the plate and again invert it. I then successively remove the first porous slab and piece of dry fabric, leaving the plate already partly set upon the naked porous slab, in which condition it may be put aside to dry. Plates so produced become, in a few days, very hard and coherent, will stand handling, and have no tendency to disintegrate when immersed in water or in a neutral aqueous solution, such as that of magnesia sulphate.

A modification of the above process for the manufacture of negative elements consists in mixing the dry litharge with about one twenty-sixth of its weight of the ammonia salt, also in a dry state, which admixture may be effected by grinding the materials together. The mixture is then spread uniformly, within the frame A B C D before described, upon a piece of cotton fabric. It is then subjected to compression in the manner before described while still in the dry state, and, lastly, the pulverulent mixture is thoroughly moistened by means of water-spray, or steam (which has the effect of consolidating the surface) followed by the spray. When the mixture has set sufficiently, the plate may be removed from the mold and set aside to dry in a warm atmosphere upon a slab of porous material, as in the previous case. By inserting in the base-block within the frame a number of slightly-conical pins corresponding in height with the intended thickness of the plate, the latter may be molded with any required number of perforations, these being necessary in the case of compound elements built up of a number of plates with a view to obtain a high rate of discharge.

I have entered thus minutely into the description of the *modus operandi* in consequence of the difficulty in manipulating the freshly-prepared material; but I do not in any way limit myself to the details of procedure here given.

Passing now to the manufacture of plates to be made the cathodes in the electrolytic process of charging, such plates may be similar to those above described, but less in thickness. In this case the plate should preferably be mounted in a frame of lead, which is itself fitted within a frame of teak-wood or other suitable material, the light lead frame being provided with tangs which are soldered to a conductor dipping into a mercury-trough, or otherwise disposed for the charge or discharge of the element; but I prefer, generally, to construct the positive elements by coating with a plastic mass of lead oxide (such as that produced with litharge and ammonic-sulphate solution when freshly mixed, as above described) plates of thin sheet-lead, preferably perforated or roughened, and having a conducting wire or tang, $w$, soldered or otherwise attached, which serves to support the element, as shown in Fig. 2. Plates so coated may, before the plastic material has set, be subjected to pressure between two sheets of felt, a rough cotton or other fabric being interposed between the coated plate and the felt to prevent adhesion to the latter of the plastic material; or, instead of coating a plate, a strip or strips of lead may be embedded in the plastic mass while in the mold for the purpose of obtaining contact with the element; or plates or masses of the lead oxide, after the same has been caused to set, as above described, may be placed on or otherwise held in contact with a cathode surface (which may be of lead) in an electrolytic tank. I prefer to effect the reduction of the reducible material into porous metallic lead by making the plates last described the cathodes in an electrolytic tank containing a solution of sulphate of magnesia as the electrolyte, the plates first herein described being the anodes in the tank; but many other electrolytes (e. g., a solution of sulphate of ammonia or of sulphate of soda) will answer the required purpose. The plates thus converted into porous-lead positive elements should be afterward immersed in water to protect them from oxidation until they are required for use. They are then ordinarily arranged in a battery-trough containing an electrolyte of dilute sulphuric acid.

The weight of active material (oxide of lead) employed in the manufacture of the positive (porous-lead) element should be about half that employed in making up the negative (peroxide) element. The minimum effective charging capacity of the positive element has been roughly estimated in practice to be two ampère hours per ounce avoirdupois of oxide of lead used in the construction of the element, whereas the minimum effective charging capacity of the negative element is estimated to be one ampère hour per ounce of litharge used.

It will be understood that the effective charging capacity here referred to is measured by the product of the current generated under a high electro-motive force into the time during which such current passes, the capacity, as measured by the total discharge of the element, being very much greater than that above stated.

Reverting now to the plates intended for conversion into negative elements, these may simply be applied to a supporting anode surface of lead inclined at an angle of fifty to sixty degrees from the horizontal and furnished with a ledge of non-conducting material upon which rest the lower edges of the plates; but I prefer to perforate the plates with two holes, as shown in Fig. 3, and to clamp to them strips of lead $s$, of which one side (the outer) has been protected by a varnish or coating of insulating-cement, and the other side (to be in contact with the plate) has been superficially coated with peroxide of lead by electrolysis in dilute sulphuric acid. The strips are attached to the plates by means of screws and nuts of vulcanite or other suitable non-oxidizable material; or, as in Figs. 4 and 5, instead of the strips of lead, strips of ebonite, (vulcanite,) to the under surfaces of which two or more strips, $p\ p$, of platinum are cemented, which strips are in electrical contact with a conductor, $w\ w$, (protected by insulating material, except at the bent-down extremity,) serving to support the element within the tank or trough, may be clamped to the plates by means of ebonite screws and nuts, the ebonite strip being firmly attached to the conductor $w\ w$ in order to prevent any strain upon the platinum strips. When the plates are large, they may be further supported near each end by means of two strips of vulcanite or other suitable material, attached to $w\ w$ and bent up or hooked at their lower extremity, so as to embrace the lower edge of the plate. But in supporting the plate care must in all cases be taken to allow free expansion and contraction, a rigid attachment being, strictly speaking, allowable only at one point of the plate. Neglect of this precaution (as, for instance, confining the plate within a closely-fitting frame) may result in warping, exfoliation, and disintegration of the element by the effect of expansion and contraction in charge and discharge, whereas if expansion can take place freely the element will last in perfect condition for an indefinite period. The plates so mounted are suspended between two cathodes (usually the cathode-plates previously described) in an electrolytic tank or in a battery-trough containing, in the first place, a neutral solution, such as a solution of sulphate of magnesia about half saturated, or a solution of sulphate of soda or sulphate of ammonia.

The plates ordinarily require to be charged and discharged several times before they are sufficiently "formed" or converted into peroxide of lead. After the first or second charge the electrolyte employed may be a dilute solution of sulphuric acid. According to the degree of porosity of the plate, the number of charges in acid (subsequent to the preliminary charge in the sulphate-of-magnesia solution) which are necessary to "form" the plate varies from two to six, the less porous plates taking the longer time to effect the conversion. The plates should be somewhat slowly discharged after each charge excepting the last.

Before proceeding to effect the electrolytic conversion into peroxide of lead of the plates of lead oxide I prefer, in most cases, to superficially peroxidize them by chemical means—viz., by the oxidizing action of chlorine in the presence of water, as hereinafter described. The elements thus produced may even, in some cases, be used in a battery without the employment of the electrolytic means of conversion.

My invention has therefore for its object, secondly, the production of this more or less superficial coating of peroxide of lead upon plates or concreted masses mainly composed of oxide of lead which are to be converted into negative elements for use in a secondary or primary battery. The most convenient form in which chlorine can be utilized for the purpose in view is in its combination as a hypochlorite; but the use of calcic hypochlorite (chloride of lime) is objectionable by reason of the difficulty of obviating the production within the pores, and on the surface of the plates when the same are made up into a battery with a sulphuric acid electrolyte, of sulphate of lime—a salt which is practically insoluble, and which is formed by the decomposition of any calcic chloride remaining in the plate, and also from lime deposited on the plate as carbonate. I therefore prefer to use chloride of soda (sodic hypochlorite) or chloride of magnesia, (magnesic hypochlorite,) which may be obtained by decomposing a solution of chloride of lime by means of sodic carbonate or magnesic sulphate. But in operating on a large scale I economically generate and utilize the magnesic hypochlorite as follows: I pass chlorine gas into the lower part of a tank containing hot water, in which the plates to be converted are supported, preferably edgewise and at a small distance apart. The plates preferably rest on a perforated false bottom, beneath which is placed a quantity of calcined magnesite or other form of magnesia in powder, into the midst of which the chlorine is introduced by perforated stoneware tubes or other suitable means. The tank and false bottom are preferably made of stoneware or slate. The magnesia gradually becomes dissolved by reason of its conversion into hypochlorite and chloride of magnesium. It is necessary that the operation should not be continued after the magnesia is wholly dissolved without adding a fresh supply. Heat may be applied by blowing in steam, and the hot solution of magnesic hypochlorite effects a rapid and more or less superficial conversion of the surface of the plates into peroxide of lead, the depth of the conversion increasing with the porosity of the plates.

Plates made up with certain solutions (e. g., ammonic phosphate) are so fragile prior to undergoing this process of superficial peroxidization that it is desirable not to remove them from the plates of perforated earthenware upon which they were placed to dry, but to arrange them horizontally on the same plates within the chlorine-tank, the perforated plates being superposed and separated by pieces of earthenware placed between them near their edges. It is sometimes desirable to peroxidize one side only of the plates, which in this case may be laid upon panes of glass similarly superposed and separated, whereby the lower sides of the plates are protected from the action of the solution. Plates thus superficially peroxidized or "browned" may be electrolytically formed or converted in the same way as previously described for plates which are not browned.

In regard to the means for establishing effective contact with the plates when they are made up into a battery, it may be stated that small positive elements for experimental purposes may have a small piece of thin sheet-lead folded over their upper edge, to which a binding-screw is clamped, and small lithanode or negative plates may have a piece of platinum-foil over one of their edges; or, in in either case, the upper edge of the plate may be immersed in melted paraffine-wax, which is subsequently scraped from the surface, so as to expose the conducting material, and thus to allow of an effective contact being made by a binding-screw, which will, by this means, be protected from the acid electrolyte rising in the plate by capillary action. I, however, prefer the system (shown in Fig. 2) of using a lead support in the case of the positive element, this system being equally applicable for large positive elements. I sometimes embed in small negative elements a piece of platinum wire, the embedded portion of which has been beaten to a flattened and irregular form; or I construct such small elements with a groove in the edges of a plate or around the upper part of a cylinder, in which groove is placed a lead wire which encircles, wholly or partially, the element, and may be soldered at its ends to a supporting-wire. This lead wire, in the preparation of the plate, becomes superficially converted into peroxide of lead, and the portion of the plate around which the wire is applied being subsequently immersed in melted paraffine-wax, the wire is protected from contact with the electrolyte, and therefore from "local action." The contact by means of a strip of lead, as shown in Fig. 3, is not well adapted for the discharge of the negative (lithanode) plate when the latter forms a portion of a battery, and, on the other hand, a thin strip, frame, or other contact of dense carbon, although suitable for discharge, speedily disintegrates if employed for charging the plates. The contact-piece shown in Fig. 4 is well adapted both for discharging the negative plate and also for charging it, provided care be taken to avoid overcharging the element or to remove chloride of lead from the element by washing with hot water, as the evolution of chlorine gas would in course of time have the effect of destroying the platinum strips.

Having now particularly described and ascertained the nature of the said invention and in what manner the same is to be performed, I would observe that I do not claim the specific method of applying steam to the dry mixture of oxide of lead and a salt, as such method is not my invention; neither do I claim in this application the method described for establishing contact with the plates, both of which methods will form the subject of separate applications for Letters Patent.

I do not claim bringing oxide of lead into contact with common salt, (sodic chloride,) as that is unsuitable to my process. This I have found by experiment.

What I do claim is—

1. The herein-described process of producing porous and insoluble dense and coherent plates or masses, which process consists in mixing oxide of lead with a soluble salt which will decompose and form with the oxide of lead an insoluble compound, and in finally dissolving out the residual base, leaving the mass porous.

2. The herein-described process of producing porous and yet dense and coherent plates, masses, or layers of lead compounds, which process consists in combining oxide of lead with an ammonia salt, the radical of which forms with the lead a substantially insoluble salt of lead.

3. The herein-described process of peroxidizing plates or masses of oxide of lead, consisting of submitting them to the oxidizing action of a hot aqueous solution of sodic or magnesic hypochlorite, substantially as specified.

The foregoing specification of my improvements in the manufacture of plates or elements for voltaic batteries signed by me this 1st day of April, 1886.

DESMOND GERALD FITZ-GERALD.

Witnesses:
    B. E. KNIGHT,
3 *Charteris Road, Finsbury Park, London, N.*
    F. E. S. BROWNE,
23 *Fleming Road, Lorrimore Square, London, S. E.*